Oct. 4, 1960   R. L. FEAGAN ET AL   2,954,894
CLOSURE ASSEMBLY
Filed March 28, 1957
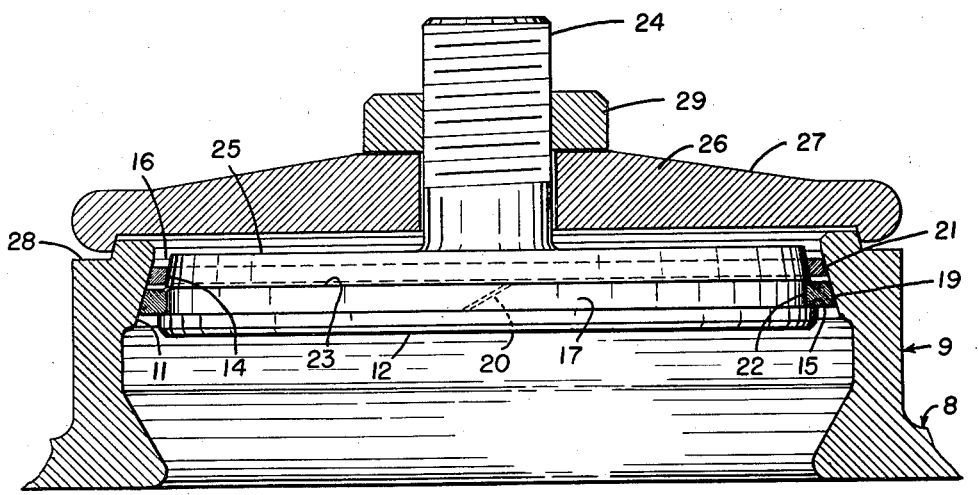
ROBERT L. CARRIEL
ROBERT L. FEAGAN
INVENTORS
BY
ATTORNEY

United States Patent Office 2,954,894
Patented Oct. 4, 1960

2,954,894

CLOSURE ASSEMBLY

Robert L. Feagan, Collinsville, and Robert L. Carriel, East St. Louis, Ill., assignors to ACF Industries, Incorporated, New York, N.Y., a corporation of New Jersey Filed Mar. 28, 1957, Ser. No. 649,115

2 Claims. (Cl. 220—25)

This invention relates generally to a closure assembly employing the principles disclosed in United States Patents Numbers 2,582,995 and 2,582,997, to M. P. Laurent on January 22, 1952.

The design of a plug and joint structure for a commercial end closure must allow for simple and fairly easy opening and closing of the closure for the purpose of installation and maintenance. In any ring type closure there are two problems involved, first, the ring or rings must be inserted through the closure opening without undue effort and, second, when the closure is made up there must be good collinearity of the axis of the ring or rings, the plug and the machined fitting seat.

Ring insertion effort is dependent upon the cross sectional area of the ring and the diameter of the ring. The use of a comparatively thin ring, that is a ring which can be deformed fairly easily in order to get it through the opening, and which can be comparatively easily reshaped to its original diameter by a closed plug load has been one solution. In using such a ring, the diameter of the plug has been increased and then diametrically opposed chordal sections have been removed to permit the plug to be inserted into the opening by tilting it. Many commercial installations using the principles set forth in the above mentioned Laurent patents employ such a flatted plug. It is especially necessary to employ such an arrangement when there is frequent necessity of assembly and disassembly such as in enclosure which will require frequent inspection and entry.

Moreover, the cross sectional area of the ring used is determined not only by whether or not a flatted plug is used, but also by the total internal pressure on the closure which is a function of the internal pressure and the square of the diameter. As the diameters of the openings increase, and/or as the internal pressure upon the plug in the opening increases, the ring becomes so heavy in cross section that flexing of the ring for entry becomes a problem. Therefore, Laurent in Patent 2,582,997 uses a split load ring and solid seal ring; however, when the split load ring is used, the alignment of the axis of the load ring, the plug and the machined seat presents a serious problem even with a flatted plug arrangement. Therefore, in the present invention, the plug, instead of being flatted, is provided with a circumferential recess to receive the load ring thereby permitting maintaining of alignment of the load ring axis during assembly. The resultant arrangement has not only resulted in more facile assembly of the closure but it has also been found that using the recessed arrangement resulted in superior closing of distorted openings.

It is an object of the present invention to provide an end closure that can be easily assembled and disassembled.

It is another object of the present invention to provide an end closure which will provide complete closing even though the opening may be slightly distorted.

It is a further object of the present invention to provide an end closure utilizing a plug and load ring and seal ring arrangement in which the plug is of a smaller diameter than the opening and the load ring is partly recessed in the plug.

Other and further objects of the invention will be obvious from an understanding of the illustrated embodiment about to be described. More will be indicated in the appending claims. Various advantages not referred to therein will occur to one skilled in the art upon employment of the invention in practice.

A preferred embodiment of the invention has been chosen for purposes of illustration and description and is shown in the accompanying drawings forming a part of the specification wherein:

Figure 1 is a view illustrating a cross section through a portion of a pressure vessel having an opening therein adapted to be closed by the present invention.

Referring now to the drawing, there is illustrated a pressure vessel 8 which may be of any design, size or shape and for any purpose for which pressure vessels may be used. The term "pressure vessel" employed herein is intended to include any structure of whatever description capable of retaining substance under pressure wherein it may be desirable to provide an opening to furnish access to the interior thereof. The invention relates to a means for and method of effecting the closure of an opening in such vessel and not specifically to the nature or purpose of the vessel.

Attached to the vessel 8 there is a weld neck fitting 9 provided with an opening 10 for which this invention provides a closure. The opening 10 is illustrated as being substantially circular in cross section and as tapering or having its sides converging from the inside of the vessel in an outward direction as shown at 11. The closure for the opening 10 is in the form of a plug 12 having a portion of its peripheral surface 14 tapered or converging in the same direction as the inner surface 11 of the opening, but in this particular instance being tapered on a lesser angle with respect to the axis of the opening. The diameter of the plug 12 is slightly less than the minimum transverse dimension of the opening so that the plug may be passed inwardly through the opening. The plug 12 is also provided with a circumferential recess 15.

The size of the plug 12 is such that when it is in position within the opening 10 there is a space 16 between the plug 12 and the tapered wall of the opening. Positioned in the groove 15 and fitting within the space 16 is a split ring 17 having its outer side 19 tapered to conform to the tapered surface of the opening. The ring is split at an angle with respect to vertical and the ends of the two halves are slightly spaced apart whereby an opening 20 is formed through the ring so that internal fluid pressure may pass therethrough to contact the seal ring 21. The inner end 22 of the load ring is encompassed by the walls of the recess 15, the rest of the ring presents an opposed surface area to the internal pressure within the vessel 8.

The load ring 17 is substantially circular in shape and is formed of material strong enough so that it will not become deformed upon exposure to pressure. Since the ring 17 is split it need not be flexed to be inserted in place and it can be formed of very hard, heavy material to withstand great loads encountered at high pressures.

Adjacent to the ring 17 and somewhat displaced from the top surface 23 thereof is another ring 21 fitting within the space 16 between a closure member 12 and wall 11 of the opening 10. The outer surface of seal ring 21 is of substantially the same shape as in the ring 17, however, due to the fact that the tapered surface is converged outwardly it is somewhat smaller in size to conform with the distance between the taper on the opening 10 and the taper 14 on the closure member 12.

A centrally located threaded stud 24 extends upwardly from the top surface 25 of the plug 12, and passes through the opening 10 of the pressure vessel and then telescopes through the center hub 26 of a spider 27. The spider 27 is positioned on top of the opening and its legs contact the top surface 28 of the fitting 9. A female threaded fastener 29 is threadedly engaged with the stud 24 and contacts the hub 26 of the spider 27 holding the plug 12 in proper position in the opening 10.

In order to assemble the closure assembly of the present invention, the plug member 12 is passed through the opening 10, inasmuch as the closure is usually a weld neck type fitting 9, the plug will not fall into the main part of the vessel 8 but is trapped by the throat 31 of the fitting 9. The two parts of the load ring 17 are then inserted into the fitting 9 and placed into the circumferential groove 15 of the plug 12. The seal ring 21 is deformed to permit entry and placed about the plug 12 above the load ring 17. The inner end of the load ring is encompassed by the wall of the circumferential groove and remains in place during assembly. The opening in the hub 26 of the spider is telescoped over the stud 24 with the legs of the spider contacting the outside surface 28 of the weld neck fitting 9. A female threaded fastener 29 is then engaged with the stud and tightened to draw the plug and rings into proper position within the opening 10.

As has been previously mentioned, the closure is often times formed of a weld neck fitting or manhole closure which is welded to the pressure vessel. Occasionally the welding of the fitting to the vessel causes distortion which makes the opening out of round. It has been found in the assembly of the present invention that even though the opening is slightly out of round a perfect seal can be obtained. As the plug 12 is drawn up into the opening, the load ring 17 will probably be the first element to contact the tapered wall 11; however, due to the fact that it is split and there is clearance between the inner diameter of the ring and the inner wall of the groove 15, this contact will not restrict upward movement of the plug at this time. Therefore the plug will continue to move upward until the seal ring 21 contacts simultaneously the wall 11 and the tapered surface of the plug. Further movement will result in deformation within the seal ring 21 until it conforms to the irregularity of the wall 11. The amount of deformation that can be compensated for will depend on the initial design gap between the load ring 17 and seal ring 21, and clearance of the load ring with the inner wall of the recess 15.

Therefore, the present invention contemplates a closure assembly that is easy to assemble and which will compensate for minor out of roundness of the opening.

We claim:

1. A closure assembly for an opening in a pressure vessel comprising: a pressure vessel, a frusto conical opening in said vessel, the peripheral surface of the wall defining the frusto conical opening taperingly converging outwardly of the vessel, a closure member for said opening, the closure member being circular in plan and having an outwardly converging tapered surface commencing at the outer axial end of the closure member, the maximum diameter of said closure member being less than the minimum diameter of said frusto conical opening, whereby the closure member may be inserted through the frusto conical opening, the peripheral wall surface of said frusto conical opening being spaced apart from the tapered surface of said closure member when the closure member is in operative position providing a space therebetween, a circumferential groove in said closure member adjacent the inner axial end of the tapered surface, a rigid metal load ring formed of two substantially semi-circular portions positioned in said circumferential groove and extending radially outward toward the wall of the frusto conical opening, the peripheral surface of said ring within said groove conforming to the shape of said groove, the peripheral surface of said ring adjacent the wall of the frusto conical opening tapered to correspond to the taper of said wall, said load ring capable of withstanding the internal pressure of said vessel, a continuous metal frusto conical sealing ring of a resilient material positioned axially outwardly and spaced from said load ring, the peripheral surfaces of said sealing ring corresponding to the adjacent tapered surfaces of said closure member and said frusto conical opening, and means for manually drawing said closure member axially outward to force said sealing ring into intimate sealing contact with the wall of said closure member and said frusto conical opening establishing an initial seal.

2. The closure assembly specified in claim 1 characterized in that the taper of the closure member is less than the taper of the wall.

References Cited in the file of this patent

UNITED STATES PATENTS

| | | |
|---|---|---|
| 2,582,997 | Laurent | Jan. 22, 1952 |
| 2,729,491 | Sieder | Jan. 3, 1956 |
| 2,749,162 | Humphrey | June 5, 1956 |
| 2,760,673 | Laurent | Aug. 28, 1956 |